(12) United States Patent
Federzoni et al.

(10) Patent No.: US 7,998,381 B2
(45) Date of Patent: Aug. 16, 2011

(54) PROCESS FOR MANUFACTURING A MASTERBATCH FOR INJECTION MOULDING OR FOR EXTRUSION

(75) Inventors: Luc Federzoni, Bourgoin-Jallieu (FR);
Pascal Revirand, Saint Egreve (FR);
Michel Bailleux, Saint Barthelemy de Sechilienne (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 12/333,637

(22) Filed: Dec. 12, 2008

(65) Prior Publication Data

US 2009/0115092 A1   May 7, 2009

Related U.S. Application Data

(63) Continuation of application No. PCT/FR2007/051225, filed on May 4, 2007.

(30) Foreign Application Priority Data

Jul. 7, 2006   (FR) ..................................... 06 52865

(51) Int. Cl.
*B29C 67/02* (2006.01)
(52) U.S. Cl. ......................... 264/117; 264/128; 264/332
(58) Field of Classification Search .................. 264/117, 264/128, 328.18, 332, 125, 4.6, 29.5, 115
See application file for complete search history.

(56) References Cited

U.S. PATENT DOCUMENTS

| 4,233,254 A * | 11/1980 | Sato et al. ................... 264/37.29 |
| 5,034,352 A * | 7/1991 | Vit et al. ............................ 501/1 |
| 6,599,450 B1 * | 7/2003 | Terada et al. ................. 264/37.1 |
| 2003/0008764 A1* | 1/2003 | Wang et al. ................... 501/152 |

FOREIGN PATENT DOCUMENTS

| DE | 199 35 276 A1 | 2/2000 |
| JP | 63054488 A * | 3/1988 |
| JP | 2006-096802 A1 | 4/2006 |
| WO | 98/18973 A1 | 5/1998 |

OTHER PUBLICATIONS

L. Liu et al., "*Mixing and Characterization of 316L Stainless Steel Feedstock for Micro Powder Injection Molding*," Materials Characterizations, Elsevier, New York, NY, vol. 54, No. 3, Mar. 2005, pp. 230-238.
Jicheng Zhou, et al., "*Extrusion Moulding of Hard-Metal Powder Using a Novel Binder System*," Journal of Materials Processing Technology, vol. 137, 2003, pp. 21-24.

* cited by examiner

*Primary Examiner* — Christina Johnson
*Assistant Examiner* — Galen Hauth
(74) *Attorney, Agent, or Firm* — Burr & Brown

(57) ABSTRACT

The invention relates to a method for preparing a feedstock for injection moulding or for extrusion, consisting of inorganic powders combined with an organic, particularly polymeric binder. This method is characterized in that the constituent particles of the inorganic powders are subjected to a granulation step, prior to their mixing with the polymeric binder.

12 Claims, 1 Drawing Sheet

PROCESS FOR MANUFACTURING A MASTERBATCH FOR INJECTION MOULDING OR FOR EXTRUSION

TECHNICAL FIELD

The present invention relates to the manufacture of objects by powder injection moulding (PIM) or micro powder injection moulding (microPIM) techniques or by extrusion moulding.

More precisely, it relates to a novel method for manufacture of the feedstocks used for injection moulding, or for extrusion, based on the use of a double granulation cycle.

The use of feedstocks obtained by this method serves in particular to obtain pieces with a virtually perfect uniformity of distribution.

PRIOR ART

Injection or extrusion moulding techniques are used to manufacture various objects, in particular:
- micro objects with very fine geometric details (micron-scale according to the size of the particles used); e.g.: MST, micro-pulley, micro-gear;
- macroscopic objects with very fine surface textures (micron-scale according to the size of the particles used); e.g.: watch case.

In a powder injection moulding (PIM) or extrusion method, the first step consists in obtaining a feedstock suitable for the intended application.

Feedstocks consist of a mixture of organic matter (or polymeric binder) and inorganic powders (metal or ceramic). The load factor corresponding to the volume proportion of powder in the batch is generally about 50 to 70%.

The feedstock is then injected or extruded like a thermoplastic. The piece is then stripped of binder and then sintered.

The load factor in the feedstock is a critical parameter. In fact, the higher the load factor, the lower the sintering shrinkage. Manufacturers therefore seek to maximize the load factor, to limit sintering shrinkage to the minimum.

Thus, research is focused on selecting the optimized particle size distribution, in order to increase this load factor. These solutions usually entail the selection of bimodal particle size distributions and usually spherical morphologies.

In consequence, these techniques are widely used for the manufacture of parts based on:
- powders fabricated by spray drying;
- powders fabricated by the carbonyl process, which produces fine spherical powders;
- chemical processes for obtaining spherical powders.

These powder synthesis processes are usually costly and limit the potential for the utilization of the injection or extrusion techniques.

Furthermore, the powder injection moulding (PIM) technique has applications in the field of ultrafine powders. This is referred to as microPIM.

However, it has been observed that the use of these ultrafine powders causes an increase in the viscosity of the batches at iso-load factor. This mechanism is explained by the increase of the specific surface area of the powders, making the surface effects predominant in the rheological behaviour of the batches.

Thus, developments under way are confronted with this problem. Today, the only solutions developed consist in replacing the conventional batches by the mixtures based on very low viscosity wax. However, these solutions have limits and it appears impossible to obtain feedstocks based on nanopowders. In fact, the utilization of this method for the fabrication of micro components (very fine details), of components with a very good surface condition (low Ra), or simply components with very good mechanical properties (nano materials) appears to be extremely promising.

Conventionally, feedstocks are synthesized by hot mixing (blending) of the constituents: plasticizer, binder, powders, surfactant. The mixing is commonly followed by an extrusion operation in order to complete the homogenization of the mixture. This type of technique only produces feedstocks having load factors that are too low to manufacture objects from nanometre-scale powders (<100 nm). By way of example, the use of 50 nm spherical powder in a PEG/polyethylene mix leads to a load factor of 42% by the conventional method. This load factor is insufficient to prevent the collapse of the pieces after binder removal.

Furthermore, and very often, the homogeneity of the feedstock remains insufficient.

Many investigations pertain to the difficulty of obtaining a homogeneous mixture. The proliferation of extrusion operations is one partially satisfactory solution at the industrial scale.

In fact, good homogeneity is important for two reasons:
- binder removal can only be carried out properly on homogeneous batches. The risk of cracking is commensurately lower;
- during the sintering operation a heterogeneous mixture leads to non-uniform shrinkage, usually yielding pieces that are distorted, or even cracked.

For microPIM, the problem of homogeneity is even more important than for conventional PIM: due to the use of ultrafine powders, removal of the binder is even more difficult because the gases and liquids must be able to escape via microchannels. Moreover, the homogeneity of the batch is even more difficult to obtain because the fine powders tend to aggregate. This is why surfactants, such as stearic acid, oleic acid, etc. are commonly incorporated. These surfactants also contribute to reduce the load factor in the batch.

The technical problems associated with conventional techniques for fabricating feedstocks are illustrated in the document "*Mixing and characterisation of 316L stainless steel feedstock for micro powder injection molding*", L. Liu et al, Materials Characterization 54 (2005) 230-238 for PIM and in the document "*Extrusion moulding of hard-metal powder using a novel binder system*", J. Zhou et al, Journal of Materials Processing Technology 137 (2003) 21-24 for extrusion.

An obvious need therefore exists to develop novel feedstocks for injection moulding or extrusion, serving in particular to incorporate nanopowders, high load factors, and having good homogeneity.

OBJECT OF THE INVENTION

The subject of the present invention is a feedstock and its method of preparation. This feedstock consists of granules whereof the morphology is the most suitable for transportation during the injection or extrusion step, even for a high load factor. These granules consist of powders, or even nanopowders, encapsulated in a mechanically strong adhesive. These granules are then transported during the injection or extrusion step by a second polymer acting as a fluidizer.

According to a first aspect, the invention relates to a method for preparing feedstocks by injection moulding or by extrusion.

This method is characterized by the fact that, prior to their mixing with the polymeric binder suitable for injection or extrusion, the powder particles are subjected to a granulation step.

This step is advantageously carried out by spray drying, but any other granulation method may be suitable.

The granulation can be carried out in the presence of a mechanically strong thermoplastic polymer, which may or may not be soluble in water, such as polyvinyl alcohol (PVA). However, it may also be carried out in the absence of polymer, the hydrophilic property of the powders being sufficient for their aggregation. This step serves to convert the powder or nanopowder into a granule having a spherical shape that is always suitable for moulding techniques.

Advantageously and in a second step, the mixing between the powder particles after granulation and the polymeric binder is carried out during a second granulation cycle, advantageously by spray drying. Alternatively, the mixing can be carried out by conventional blending.

The granules are sprayed a second time with an organic binder, which acts as a carrier fluid for the subsequent injection or extrusion operation. The implementation of this spray drying (or any other granulation operation) is carried out so as to avoid touching the spherical granular structure issuing from the first granulation operation. While the first spray dry step can be carried out at high temperature (for example 80° C.), this second granulation is advantageously carried out at ambient temperature.

It should be noted that a polymeric binder suitable for this second granulation step and, above all, for injection, is PEG (polyethylene glycol).

During this second granulation step, a powder is advantageously added to the batch. It is preferably the same powder (or the same powders) as that (those) used initially, that is, in the first granulation step. It may have the same particle size distribution as the starting powder, or a lower, or even much lower particle size distribution (up to 10 nm). It is also possible to add a powder having any particle size distribution and different chemical properties. By way of example, a nanometre-scale $Al_2O_3$ powder can be added to the macroscopic copper powder of 10 microns.

In the case in which conventional mixing replaces the second granulation cycle, the advantageously ultrafine powder is incorporated with the granules issuing from the first spraying step, as well as the organic binders. In this case, a slurry consisting of a uniform distribution of granules, ultrafine powder and organic binder, is obtained.

After the first granulation step, the granules can be stripped of binder and/or presintered in order to give them appropriate mechanical properties.

By means of this method, the feedstock obtained is absolutely remarkable in many respects:
  it can be obtained from ultrafine powders, or even nanopowders (particle size lower than 100 nm);
  the distribution of components is very uniform in the batch.
This method therefore has the following advantages:
  virtually perfect uniformity of composition;
  possibility of introducing nanoparticles at high load factors, leading to low sintering shrinkage;
  the method is rapid and proves to be inexpensive.

Feedstock preparation is only the first step of an injection moulding process which conventionally comprises four steps:
  mixing of the powder(s) with a polymeric binder;
  injection of the batch into the mould;
  removal of the binder from the moulded part;
  sintering of the moulded part.

Furthermore, such a feedstock can be used in an extrusion moulding process comprising the following steps:
  mixing of powder(s) with a polymeric binder;
  introduction of the batch into a die;
  binder removal;
  sintering.

The invention therefore also relates to an injection (of microPIM) or extrusion moulding method, in which the first step is carried out by the method for preparing a feedstock described above.

For certain applications, it is advisable for the granules present in the feedstock to be destroyed.

For injection, this "explosion" of the granules is carried out at the time of injection into the mould by two possible operations:
  heating of the mould: the mould temperature is such that it causes the binder to soften, keeping the nanoparticles together;
  and/or the injection pressure at the contact of the mould walls causes degranulation of the nanoparticles.

Similarly, for extrusion, the destruction of the granules takes place by heating or by pressure at the die outlet.

Such a method serves to manufacture objects by PIM or microPIM or extrusion, with very fine, potentially nanometre-scale geometric details, due to the introduction of nanopowders into the feedstocks.

The method is suitable for manufacturing objects with a very good geometric precision, because of the low shrinkage due to the possibility of applying a high load factor in the feedstock.

The method serves to transport the initial powders in any morphology in the form of spherical granules. This accordingly serves to eliminate the need for the costly powders commonly used in PIM, issuing for example by gas spray processes for obtaining spherical powders.

EXEMPLARY EMBODIMENTS

The following exemplary embodiments, in conjunction with the appended figures, are intended to illustrate the invention but are non-limiting.

EXAMPLE 1

Preparation of a Feedstock Based on Silica Nanopowder with a Minimum Load factor of 60%

Figure 1:
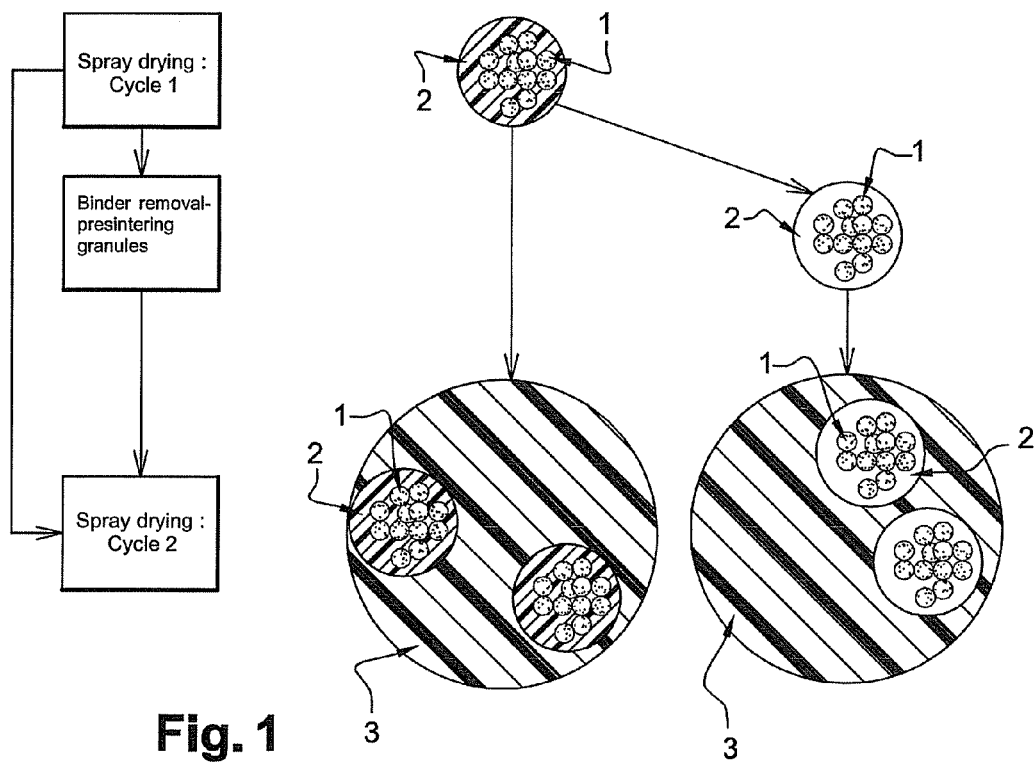
FIG. 1 shows the treatment undergone by the powder particles according to the feedstock fabrication method of the invention.

In this example shown in FIG. 1, nanometre-scale silica of the OX50 type from DEGUSSA 1 is used. This powder has an average particle size distribution of 50 nm. The powder is first aggregated around a binder such as polyvinyl alcohol (PVA) 2 by spray drying. This spraying is carried out at 80° C.

After the first spray drying cycle, the granules are taken up for a second spray drying cycle with a polymer of the PEG (polyethylene glycol) type 3. This second cycle is carried out at ambient temperature. At this temperature, the PVA remains in the solid state and the granule is not dissolved.

The feedstock thus prepared has outstanding uniformity of composition.

The batch is then employed in an injection press under the following conditions:
  injection temperature: 100° C.;

mould temperature: 140° C.
The mould is then cooled before stripping.

EXAMPLE 2

Performance of a Binder Removal—Presintering Step between the Two Spray Drying Cycles This example illustrates the possibility of controlling the solidity of the granules issuing from the first spray drying by carrying out a binder removal—presintering step, also shown in FIG. 1.

On completion of the first spray drying step, the granules are stripped of binder for one hour at 1000° C. and slightly presintered. The new granules are used for the second spray drying step.

The feedstock at 100° C. is then injected on a cold mould with its temperature regulated at 30° C. The injection pressure suffices to burst the granules in contact with the mould.

EXAMPLE 3

Addition of Powder during the Second Spray Cycle

Figure 2:
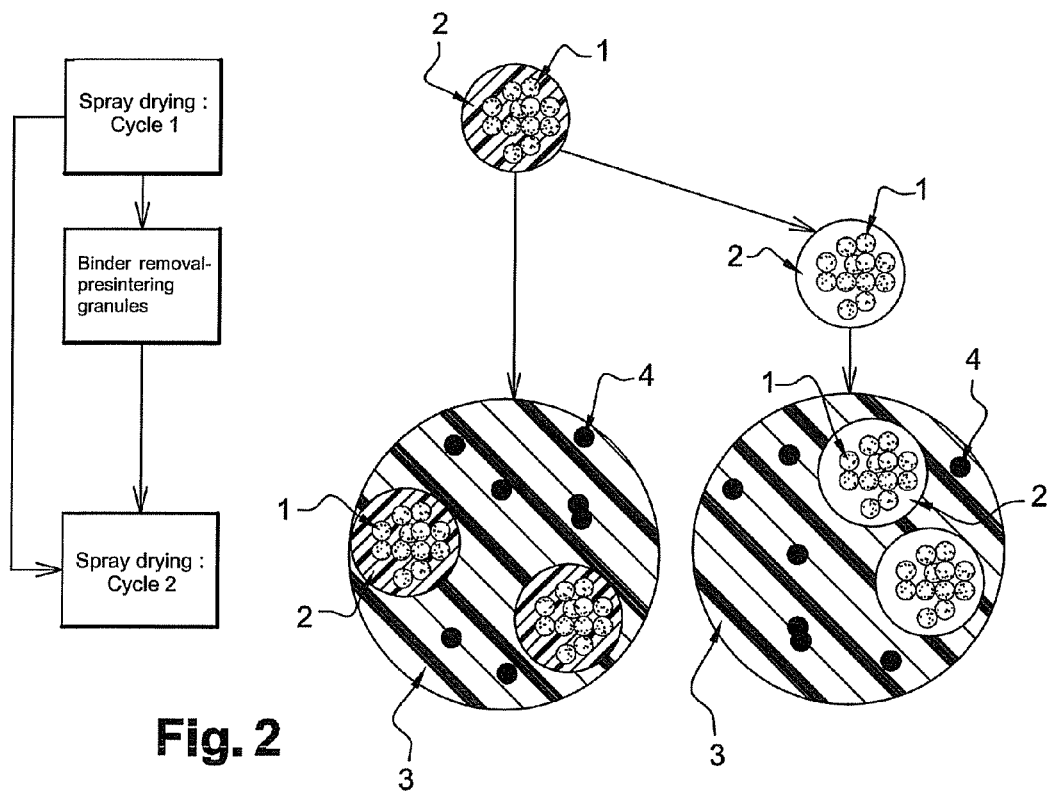
FIG. 2 is different from FIG. 1 in that a powder is introduced during the second spray drying step.

In this example shown in FIG. 2, copper powder 1, whereof the particles have a size of about one micron, is sprayed during the first spray drying cycle. The granules are then presintered during a thermal cycle at 800° C.

During the second spray cycle, ultrafine powder 4, whereof the particles have a size of about one micron, is added. The quantity added is approximately the same as the quantity added during the first spray cycle.

In this example, the addition of the ultrafine powder in the second cycle serves to obtain high load factors but also to improve the mechanical strength of the binder-free parts.

EXAMPLE 4

Performance of the First Spray Drying Step in the Absence of Polymer

The conditions for preparing the feedstock are comparable to those described in example 2, but the DEGUSSA OX50 powder is sprayed without organic binder. The hydrophilic property of the powders suffices to aggregate the nanopowders after the first spray drying operation. In a second step, the granules are directly presintered at 1000° C. The granules thus generated are used for the second spray drying step.

Similarly, the feedstock at 100° C. is injected on a cold mould with a temperature regulated at 30° C. The injection pressure suffices to burst the granules in contact with the mould.

EXAMPLE 5

Fabrication of a Filter Membrane by Injection Moulding

The conditions for preparing the feedstock are comparable to those described in example 2, but the DEGUSSA OX50 powder is sprayed without organic binder. The hydrophilic property of the powders suffices to aggregate the nanopowders after the first spray drying operation.

In a second step, the granules are directly presintered at 1,100° C. to give them better mechanical properties. The granules thus generated are used in the second spray drying step.

The feedstock at 100° C. is injected on a cold mould with a temperature regulated at 30° C. In this example, the better mechanical strength of the granules associated with a high presintering temperature, prevents the granules from exploding under the injection pressure. The maintenance of the powder in granular form is desirable for the intended final application, that is, the fabrication of filter membranes.

EXAMPLE 6

Fabrication of an Alumina Part

In this example, an alumina part is fabricated starting with powders in the form of 120 nm long and 50 nm wide rods. The rods are sprayed under the same conditions as those described in examples 1 and 2, that is, in the presence of PVA. The granules resulting from this spraying are re-sprayed in PEG, with a total load factor of 65%.

The feedstock at 100° C. is then injected on a cold mould with a temperature regulated at 30° C. The injection pressure suffices to burst the granules in contact with the mould.

The invention claimed is:

1. A method for preparing a feedstock for injection moulding or extrusion of one or more inorganic powders with a polymeric binder, comprising:
    granulating said one or more inorganic powders in a first granulation step to form a plurality of first granules, wherein said one or more inorganic powders has a particle size smaller than 100 nm and said plurality of first granules have a spherical shape;
    presintering the first granules;
    mixing said plurality of presintered first granules with said polymeric binder in a second granulation step; and
    improving the homogeneity and uniformity of the distribution of said plurality of presintered first granules in said polymeric binder by adding a powder to said plurality of presintered first granules and said polymeric binder during said second granulation step.

2. Method for granulating a feedstock according to claim 1, wherein the powder used is the same as that used in the first granulation step.

3. Method for preparing a feedstock according to claim 1, wherein at least the first granulation step, preferably both, is carried out by the spray draying technique.

4. Method for preparing a feedstock according to claim 1, wherein a binder removal step and the presintering step are carried out after the first granulation step.

5. Injection moulding method comprising the following steps:
    preparation of a feedstock by the method described in claim 1;
    injection of the feedstock into the mould;
    binder removal; and
    sintering.

6. Injection moulding method according to claim 5, wherein the granules in the feedstock are destroyed during the injection into the mould.

7. Injection moulding method according to claim 6, wherein the granules in the feedstock are destroyed by heating the mould.

8. Injection moulding method according to claim 6, wherein the granules in the feedstock are destroyed by the injection pressure.

9. Extrusion moulding method comprising the following steps:
    preparation of a feedstock by the method described in claim 1;

injection of the feedstock into the die;
binder removal; and
sintering.

10. Injection moulding method according to claim 9, wherein the granules in the feedstock are destroyed at the outlet of the die.

11. Injection moulding method according to claim 10, wherein the granules in the feedstock are destroyed by the heating.

12. Injection moulding method according to claim 10, wherein the granules in the feedstock are destroyed by the pressure at the outlet of the die.

* * * * *